United States Patent
Portnov et al.

(10) Patent No.: US 12,375,543 B2
(45) Date of Patent: Jul. 29, 2025

(54) SYSTEMS AND METHODS FOR DISTRIBUTED DATA DETECTION AND DATA PREPROCESSING FOR DATA DETECTION TASKS

(71) Applicant: EVERYSIGHT LTD., Haifa (IL)

(72) Inventors: Alexei Portnov, Haifa (IL); Asaf Ashkenazi, Haifa (IL); Hanan Shamir, Haifa (IL)

(73) Assignee: EVERYSIGHT LTD., Haifa (IL)

( * ) Notice: Subject to any disclaimer, the term of this patent is extended or adjusted under 35 U.S.C. 154(b) by 0 days.

(21) Appl. No.: 17/194,516

(22) Filed: Mar. 8, 2021

(65) Prior Publication Data

US 2021/0281622 A1    Sep. 9, 2021

Related U.S. Application Data

(60) Provisional application No. 62/986,790, filed on Mar. 9, 2020.

(51) Int. Cl.
| | |
|---|---|
| *H04L 65/612* | (2022.01) |
| *H04L 12/28* | (2006.01) |
| *H04L 43/02* | (2022.01) |
| *H04L 43/022* | (2022.01) |
| *H04L 43/065* | (2022.01) |

(52) U.S. Cl.
CPC ........ *H04L 65/612* (2022.05); *H04L 12/2803* (2013.01); *H04L 43/02* (2013.01); *H04L 43/022* (2013.01); *H04L 43/065* (2013.01)

(58) Field of Classification Search
CPC ... H04L 65/4084; H04L 43/02; H04L 43/022; H04L 43/065; H04L 12/2803
USPC ........................................................ 709/219
See application file for complete search history.

(56) References Cited

U.S. PATENT DOCUMENTS

| | | | |
|---|---|---|---|
| 6,285,992 B1 * | 9/2001 | Kwasny ............... | G06K 9/6267 706/20 |
| 10,658,005 B1 * | 5/2020 | Bogan, III ........... | G10L 21/003 |
| 2010/0239143 A1 * | 9/2010 | Griswold ............. | G06K 9/6247 382/131 |
| 2015/0363282 A1 * | 12/2015 | Rangasamy ........ | G06F 11/2033 714/4.12 |
| 2018/0284758 A1 * | 10/2018 | Cella ...................... | G06N 3/088 |
| 2019/0317952 A1 * | 10/2019 | Li .......................... | G06F 16/287 |

(Continued)

*Primary Examiner* — Suraj M Joshi
*Assistant Examiner* — Ayele F Woldemariam
(74) *Attorney, Agent, or Firm* — PEARL COHEN ZEDEK LATZER BARATZ LLP

(57) ABSTRACT

A method of distributed data detection may include: obtaining, by an end-unit, a plurality of datasets; streaming, by the end-unit to a remote computing device, at least a part of the obtained datasets; determining, by the end-unit, end-unit related information and sending the end-unit related information to the remote computing device; receiving, by the remote computing device, a desired data portion related information; selecting, by the remote computing device, based on at least a part of the obtained datasets and at least one of: the end-unit related information and the desired data portion related information, an operation to be used by the end-unit to detect the desired data portion in at least a part of the obtained datasets; and detecting, by the end-unit, the desired data portion in at least a part of the obtained datasets using the selected operation.

11 Claims, 4 Drawing Sheets

(56) References Cited

U.S. PATENT DOCUMENTS

2020/0160151 A1\* 5/2020 Urtasun ............... G06K 9/6256
2021/0011288 A1\* 1/2021 Lai ..................... G02B 27/0172

\* cited by examiner

SYSTEMS AND METHODS FOR DISTRIBUTED DATA DETECTION AND DATA PREPROCESSING FOR DATA DETECTION TASKS

CROSS REFERENCE TO RELATED APPLICATIONS

This application claims the benefit of U.S. Provisional Patent Application No. 62/986,790, filed Mar. 9, 2020, which is incorporated herein by reference in its entirety.

FIELD OF THE INVENTION

The present invention relates to the field of distributed data detection and data preprocessing for data detection tasks.

BACKGROUND OF THE INVENTION

Some applications may require low latency, low weight and low power computational devices in order to provide an effective solution. For example, smart glasses that utilize augmented reality (AR) may require local processing of data, as external processing of data may lead to relatively large latency that is not acceptable for AR. However, local processing of data may require significant computational resources and power supply, which may make the smart glasses heavy.

SUMMARY OF THE INVENTION

Some aspects of the present invention may provide a method of distributed data detection, which method may include: obtaining, by an end-unit, a plurality of datasets; streaming, by the end-unit to a remote computing device, at least a part of the obtained datasets; determining, by the end-unit, end-unit related information and sending the end-unit related information to the remote computing device; receiving, by the remote computing device, a desired data portion related information; selecting, by the remote computing device, based on at least a part of the obtained datasets and at least one of: the end-unit related information and the desired data portion related information, an operation to be used by the end-unit to detect the desired data portion in at least a part of the obtained datasets; and detecting, by the end-unit, the desired data portion in at least a part of the obtained datasets using the selected operation.

Some embodiments may include determining, by the remote computing device, operation parameters for the selected operation based on at least a part of the obtained datasets and at least one of: the end-unit related information and the desired data portion related information; and detecting, by the end-unit, the desired data portion in at least a part of the obtained datasets using the selected operation and the determined operation parameters.

Some embodiments may include selecting the operation by the remote computing device and detecting the desired data portion by the end-unit in real-time based on the same part of the obtained datasets.

Some embodiments may include selecting the operation by the remote computing device based on a streaming history of the obtained datasets from the end-unit to the remote computing device.

Some embodiments may include selecting the operation by the remote computing device based on at least a part of datasets obtained by one or more additional end-units and based on at least one of: the end-unit related information and the desired data portion related information.

Some embodiments may include detecting, by the end-unit, the desired data portion in a first part of the obtained datasets using the selected operation; and detecting, by the remote computing device, the desired data portion in a second part of the obtained datasets using the selected operation.

Some embodiments may include determining a ratio between the first part and the second part of the obtained datasets being processed by the end-unit and the remote computing device, respectively, based on at least one of: a type of the datasets, a type of the desired data portion to be detected, the end-unit related information, a rate of successful detections of the desired data portions by the end-unit and any combination thereof.

Some embodiments may include updating the selected operation based on a rate of successful detections of the desired data portion by the end-unit.

Some embodiments may include determining a rate of transmission of the obtained datasets from the end-unit to the remote computing device based on at least one of: a rate of successful detections of the desired data portion by the end-unit, the end-unit related information, the obtained datasets, a desired latency and any combination thereof.

Some embodiments may include applying, by the end-unit or by an external computing device, a predefined dataset size reduction function to at least some of the obtained datasets prior to streaming thereof to the remote computing device, wherein the dataset size reduction is predefined to reduce the size of the datasets as compared to the size thereof prior to the application of the dataset size reduction function.

Some embodiments may include predefining the dataset reduction function for the selected operation by: providing a set of dataset size reduction actions; providing one or more training datasets; generating a set of reduced size training datasets by applying at least some of the size reduction actions to at least some of the one or more training datasets; detecting the desired data portion in at least some of the reduced size training datasets using the selected operation; calculating a detection-outcome set of parameters based on the detections thereof; and defining the dataset size reduction function for the selected operation based on the detection-outcome set of parameters, the data size reduction function includes at least one of the dataset size reduction actions.

Some aspects of the present invention may provide a method of data preprocessing for detection tasks, the method may include obtaining a dataset; selecting an operation to be performed on the dataset; and applying a dataset reduction function to the dataset, the dataset reduction function is predefined for the selected operation and configured to reduce a size of the dataset as compared to the size thereof prior to the application of the dataset size reduction function.

Some embodiments may include predefining the reduction function by: providing a set of dataset size reduction actions; providing one or more training datasets; generating a set of reduced size training datasets by applying at least some of the size reduction actions to at least some of the one or more training datasets; receiving a desired data portion related information concerning a desired data portion to be detected in the one or more training datasets; detecting the desired data portion in at least some of the reduced size training datasets using an operation; calculating a detection-outcome set of parameters based on the detections thereof; defining the dataset size reduction function for the operation based on the detection-outcome set of parameters, the data size reduction function includes at least one of the dataset size reduction actions.

Some embodiments may include predefining a dataset size reduction for each of at least some of operations that may be potentially used to detect a desired data portion in the dataset.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1:
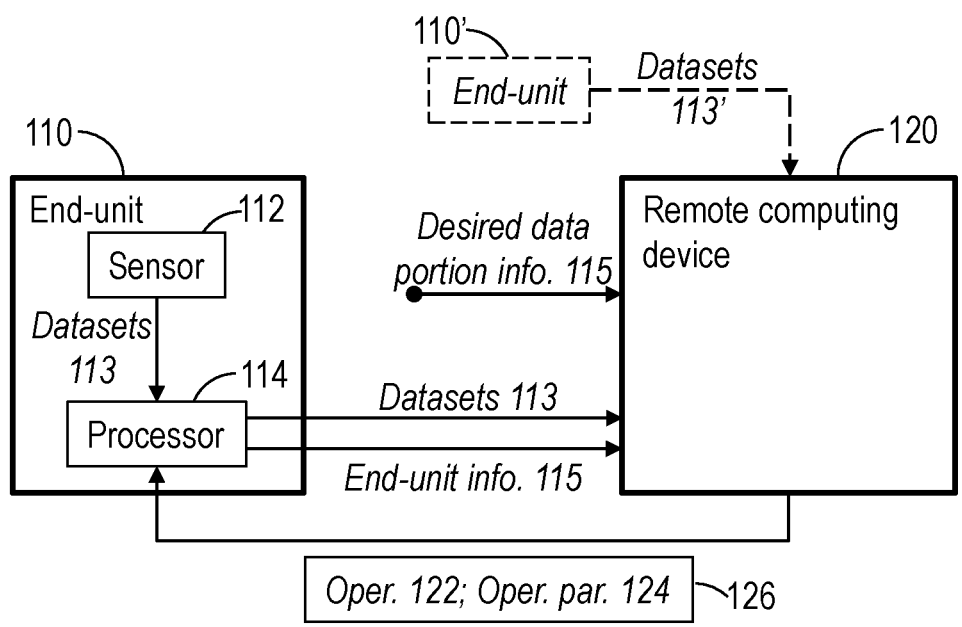
FIG. 1 is a block diagram of a system for distributed data detection, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Some aspects of the present invention may provide a system and method for distributed data detection. Some embodiments may include obtaining, by an end-unit, a plurality of datasets and streaming at least a part of the obtained datasets to a remote computing device. Some embodiments may include determining, by the end-unit, end-unit related information and sending the end-unit related information to the remote computing device. Some embodiments may include receiving, by the remote computing device, a desired data portion related information and selecting based on at least a part of the obtained datasets and at least one of: the end-unit related information and the desired data portion related information, an operation to be used by the end-unit to detect the desired data portion in at least a part of the obtained datasets. Some embodiments may include detecting, by the end-unit, the desired data portion in at least a part of the obtained datasets using the selected operation.

The disclosed system and method may significantly reduce a data portion detection latency as compared to conventional systems and methods that perform the detection only on an end-unit or a remote computing device. The disclosed system and method may enable using simpler, cheaper, less power-consuming hardware end-units as compared to conventional systems. The disclosed system and method may enable reducing the throughput needed to be transferred between the end-unit and remote computing device and/or display unit as compared to conventional systems. For example, once the desired portion is detected, only a crop of the desired portion may be transferred for classification, etc.

Some aspects of the present invention may further provide a method of data preprocessing for detection tasks. The disclosed method for data preprocessing may enable reducing the size of datasets prior to processing thereof while yet enabling detection of a desired data portion in the reduced size dataset. This may, for example, reduce computational resources required to preprocess and/or process the datasets, reduce a bandwidth required for transmitting the datasets and reduce power consumption required for preprocessing/processing of the datasets, as compared to conventional methods.

Reference is now made to FIG. 1, which is a block diagram of a system 100 for distributed data detection, according to some embodiments of the invention.

According to some embodiments, system 100 may include an end-unit 110 and a remote computing device 120.

End-unit 110 may be a low-power device such as, for example, smart glasses, etc. Remote computing device 120 may be, for example, a smartphone, a tablet, a server, etc.

In some embodiments, end-unit 110 may include a sensor 112 and an end-unit processor 114. For example, sensor 112 may be a camera that may obtain a plurality of image datasets. In another example, sensor 112 may be a microphone that may obtain a plurality of voice datasets. End-unit processor 114 may send/stream at least a part of obtained datasets 113 to remote computing device 120.

In some embodiments, end-unit processor 114 of end-unit 110 may generate an end-unit related information 115. End-unit related information 115 may include information indicative of computing capabilities and/or tradeoffs of end-unit 110. For example, end-unit related information 115 may include information concerning a type of end-unit 110, available computing resources of end-unit 110, available power resources of end unit 110, etc. End-unit processor 114 may send end-unit related information 115 to remote computing device 120. In some embodiments, end-unit processor 114 may periodically update end-unit related information 115 (e.g., in real-time or substantially in real-time).

Remote computing device 120 may receive at least a part of obtained datasets 113 from end-unit processor 114. Remote computing device 120 may receive a desired data portion related information 116. Desired data portion related information 116 may provide information concerning a desired data portion to be detected in obtained datasets 113. Desired data portion related information 116 may, for example, include a type of the desired data portion to be detected in obtained datasets 113, a region of interest (ROI) in obtained datasets 113 that most likely includes the desired data portion, etc. For example, if obtained datasets 113 include image datasets, the desired data portion to be detected may include an object or a portion thereof and/or a ROI in the image datasets that most likely includes the object or a portion thereof. Yet, in an example of image datasets, end-unit processor 114 may track a line of sight (LOS) of a user and determine the ROI based on the tracked LOS thereof. Desired data portion related information 116 may be sent to remote computing device 120 by end-unit 110 or by an external source.

Remote computing device 120 may select an operation 122 (e.g., from multiple predefined operations) to be used by end-unit 110 to detect the desired data portion in obtained datasets 113. The selection of operation 122 may be based on at least a part of obtained datasets 113 and at least one of: end-unit related information 115 and desired data portion related information 116.

Remote computing device 120 may select operation 122 to optimize detection of the desired data portion (e.g., provided in desired data portion related information 116) by end-unit 110 while considering real-time computational capabilities and/or tradeoffs (e.g., provided in end-unit related information 115) of end-unit 110. For example, remote computing device 120 may run different available operations capable of detecting the desired data portion (e.g., provided in desired data portion related information 116) and determine detection parameters (e.g., detection latency, power consumption, detection rate, etc.) for each of the operations thereof while taking into account end-unit related information 115. Remote computing device 120 may compare detection parameters determined for different operations and select operation 122 that has provided best results (e.g., minimal detection latency, minimal power consumption, maximal detection rate, etc.).

In some embodiments, remote computing device 120 may determine operation parameters 124 for selected operation 122. For example, operation parameters 124 may be determined based on at least a part of obtained datasets 113 and at least one of: end-unit related information 115 and desired data portion related information 116. Operation parameters 124 may be determined to optimize detection of the desired data portion by end-unit 110 (e.g., as described above).

Remote computing device 120 may send to end-unit 110 a metadata 126 providing information regarding at least one of: operation 122 to be used by end-unit 110 to detect the desired data portion in obtained datasets 113 and operation parameters 124.

End-unit processor 114 may receive metadata 126 from remote computing device 120. End-unit processor 114 may detect the desired data portion in at least a part of obtained datasets 113 using selected operation 122 and/or operation parameters 124.

In some embodiments, selection of operation 122 by remote computing device 120 may be performed in real-time (or substantially in real-time). For example, selection of operation 122 by remote computing device 120 and detection of the desired data portion by end-unit 110 using selected operation 122 may be based on the same part (or substantially the same part) of obtained datasets 113.

In some embodiments, selection of operation 122 by remote computing device 120 may be based on a streaming history of obtained datasets 113. For example, end-unit processor 114 may send a first subset of obtained images 113 to remote computing device 120. Remote computing device 120 may select operation 122 and/or determine operation parameters 124 based on the first subset of obtained images 113 (e.g., as described above). End-unit processing 114 may detect the desired data portion in a second subset of obtained datasets 113 using selected operation 122 and/or operation parameters 124, wherein the second subset is subsequent to the first subset.

In some embodiments, selection of operation 122 by remote computing device 120 may be based on at least a part of datasets 113' being obtained by one or more additional end-units 110' (e.g., each being similar to end-unit 110). For example, remote computing device 120 may receive at least a part of datasets 113' being obtained by one or more additional end-units 110' and select operation 122 and/or determine operation parameters 124 based on at least a part of datasets 113' from additional end-unit(s) 110' and based on end-unit related information 115 received from end-unit 110. End-unit 110 may detect the desired data portion based on datasets 113 obtained by sensors 112 of end-unit 110 and using operation 122 and operation parameters 124 selected based on datasets 113' from additional end-unit(s) 110'.

In some embodiments, remote computing device 120 may also detect the desired data portion in at least a part of obtained datasets 113 using selected operation 122 and selected operation parameters 124. For example, end-unit 110 may detect the desired data portion in a first part of obtained datasets 113, and remote computing device 120 may detect the desired data portion in a second part of obtained datasets 113. The ratio between the first part and the second part may be determined based on, for example, a type of datasets 113 (e.g., image datasets, voice datasets, etc.), a type of the desired data portion to be detected, end-unit related information 115, a rate of successful detections of the desired data portions by end-unit 110, etc. For example, the second part of obtained datasets 113 being processed by remote computing device 120 may be increased as compared to the first part of obtained datasets 113 being processed by end-unit 110 if the rate of successful detections of the desired data portion by end-unit 110 is lower than a specified detections threshold and/or if datasets 113 and/or the desired data portion to be detected require significant computational resources to be processed.

In some embodiments, remote computing device 120 may update at least one of selected operation 122 and determined operation parameters 124 based on a rate of successful detections of the desired data portion by end-unit 110 (and optionally by remote computing device 120). For example, if the rate of successful detections of the desired data portion by end-unit 110 is below a specified threshold, remote computing device 120 may select different operation 122 to be used by end-unit 110 and/or update operation parameters 124 of selected operation 122.

In various embodiments, end-unit processor 114 or remote computing device 120 may determine a rate of transmission of obtained datasets 113 from end-unit 110 to remote computing device 120 based on at least one of: a rate of successful detections of the desired data portion by end-unit 110, end-unit related information 115 (e.g., available computing resources of end-unit 110, available power resources of end unit 110, etc.), obtained datasets 113 (e.g., a type of datasets 113, signal to noise ratio (SNR), etc.), a desired latency, etc. If obtained datasets 113 include image datasets, the rate of transmission of image datasets may be also determined based on, for example, the LOS of the user, a rate of change of the LOS, user's head movement dynamics, etc. These parameters may be determined by, for example, end-unit processor 114.

In some embodiments, end-unit processor 114 may preprocess at least some of obtained datasets 113 prior to sending it to remote computing device 120. In some other embodiments, the preprocessing may be performed on an external computing device. In some embodiments, the preprocessing may include application of a predefined dataset size reduction function to at least some of obtained datasets 113. The dataset size reduction function may be configured to reduce the size of datasets 113 as compared to the size thereof prior to the application of the dataset size reduction function while yet enabling to detect the desired data portion in datasets 113 (e.g., as described below with respect to FIGS. 3A and 3B). In some embodiments, the dataset size reduction function may be selected based on selected operation 122. For example, different dataset size reduction functions may be used for different operations.

Figure 2:
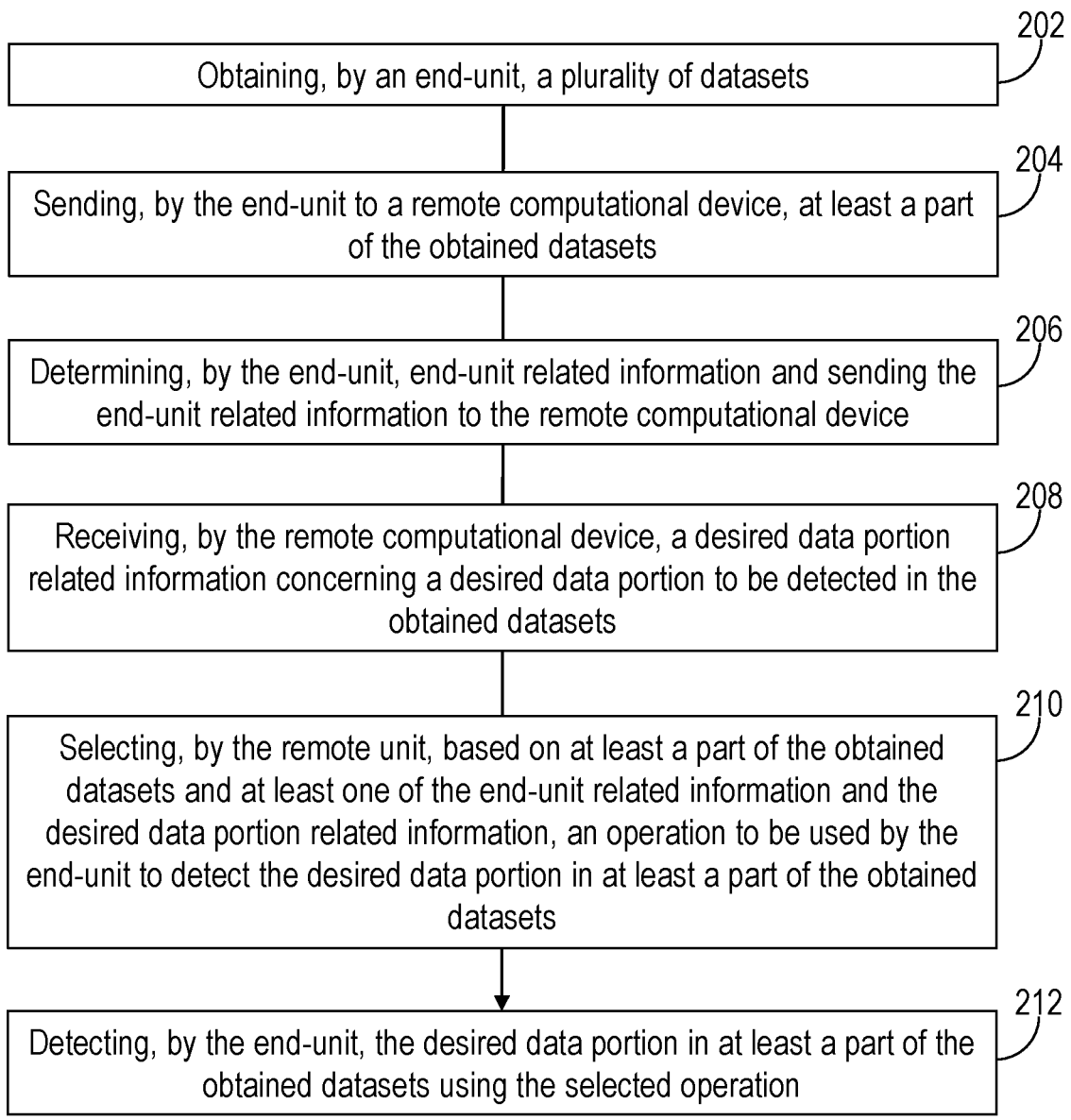
FIG. 2 is a flowchart of a method of distributed data detection, according to some embodiments of the invention.

Reference is now made to FIG. 2, which is a flowchart of a method of distributed data detection, according to some embodiments of the invention.

The method may be implemented by a system for distributed data detection (e.g., such as system 100 described above with respect to FIG. 1), which may be configured to implement the method. It is noted that the method is not limited to the flowcharts illustrated in FIG. 2 and to the corresponding description. For example, in various embodiments, the method need not move through each illustrated box or in exactly the same order as illustrated and described.

Some embodiments may include obtaining, by an end-unit, a plurality of datasets (202). For example, end-unit 110 and datasets 113 as described above with respect to FIG. 1.

Some embodiments may include sending, by the end-unit to a remote computing device, at least a part of the obtained datasets (204). For example, remote computing device 120 as described above with respect to FIG. 1.

Some embodiments may include determining, by the end-unit, end-unit related information (206). For example, end-unit related information 115 that may include information indicative of computing capabilities and tradeoffs of end-unit 110, as described above with respect to FIG. 1.

Some embodiments may include receiving, by the remote computing device, a desired data portion related information concerning a desired data portion to be detected in the obtained datasets (208). For example, desired data portion related information 116 as described above with respect to FIG. 1.

Some embodiments may include selecting, by the remote computing device, based on at least a part of the obtained datasets and at least one of the end-unit related information and the desired data portion related information, an operation to be used by the end-unit to detect the desired data portion in at least a part of the obtained datasets (210). For example, as described above with respect to FIG. 1.

Some embodiments may include detecting, by the end-unit, the desired data portion in at least a part of the obtained datasets using the selected operation (212). For example, as described above with respect to FIG. 1.

Some embodiments may include determining, by the remote computing device, operation parameters for the selected operation based on at least a part of the obtained datasets and at least one of the end-unit related information and the desired data portion related information. Some embodiments may include detecting, by the end-unit, the desired data portion in at least a part of the obtained datasets using the selected operation and the determined operation parameters. For example, as described above with respect to FIG. 1.

The selection of the operation to be used by the end-unit to detect the desired data portion in at least a part of the obtained datasets and/or determination of the operation parameters may optimize the detection of the desired data portion by the end-unit while taking into account real-time computational capabilities and/or tradeoffs of the end-unit to, for example, provide minimal detection latency, minimal power consumption, maximal detection rate, etc. (e.g., as described above with respect to FIG. 1).

Some embodiments may include selecting the operation by the remote computing device and detecting the desired data portion by the end-unit in real-time based on the same part (or substantially the same part) of the obtained datasets. For example, as described above with respect to FIG. 1.

Some embodiments may include selecting the operation by the remote computing device based on a streaming history of the obtained datasets from the end-unit to the remote computing device. Some embodiments may include sending, by the end-unit to the remote computing device, a first subset of the obtained datasets. Some embodiments may include selecting the operation and determining the operation parameters by the remote computing device based on the first subset. Some embodiments may include detecting, by the end-unit, the desired data portion in a second subset of the obtained datasets, wherein the second subset is subsequent to the first subset. For example, as described above with respect to FIG. 1.

Some embodiments may include selecting the operation and/or determining the operation parameters by the remote computing device based on at least a part of datasets obtained by one or more additional end-units and based on at least one of the end-unit related information and the desired data portion related information. For example, as described above with respect to FIG. 1.

Some embodiments may include detecting, by the end-unit, the desired data portion in a first part of the obtained datasets and detecting, by the remote computing device, the desired data portion in a second part of the obtained datasets using the selected operation and/or the determined operation parameters. Some embodiments may include determining a ratio between the first part and the second part of the obtained datasets being processed by the end-unit and the remote computing device, respectively, based on at least one of a type of the datasets, a type of the desired data portion to be detected, the end-unit related information, a rate of successful detections of the desired data portions by the end-unit, etc. For example, as described above with respect to FIG. 1.

Some embodiments may include updating at least one of the selected operation and the operation parameters based on a rate of successful detections of the desired data portion by the end-unit. For example, as described above with respect to FIG. 1.

Some embodiments may include determining a rate of transmission of the obtained datasets from the end-unit to the remote computing device based on at least one of: a rate of successful detections of the desired data portion by the end-unit, the end-unit related information, the obtained datasets, a desired latency, etc. If the obtained datasets include image datasets, some embodiments may include determining the rate of transmission of the image datasets based on at least one of a LOS of a user, a rate of change of the LOS, user's head movement dynamics, etc. For example, as described above with respect to FIG. 1.

Some embodiments may include preprocessing at least some of the obtained datasets prior to sending it to remote computing device. The preprocessing may be performed by the end-unit or by an external computing device. Some embodiments may include applying a predefined dataset size reduction function to at least some of the obtained datasets, the dataset size reduction function may be configured to reduce the size of the datasets as compared to the size thereof prior to the application of the dataset size reduction function. Some embodiments may include selecting the dataset size reduction function based on the selected operation. For example, as described above with respect to FIG. 1 and as described below with respect to FIGS. 3A and 3B.

Advantageously, the disclosed system and method for distributed data detection may significantly reduce a data portion detection latency as compared to conventional systems and methods that perform the detection only on an end-unit or a remote computing device. The disclosed system and method may enable using simpler, cheaper, less power-consuming hardware end-units as compared to conventional systems. The disclosed system and method may enable reducing the throughput needed to be transferred between the end-unit and remote computing device and/or display unit as compared to conventional systems. For example, once the desired portion is detected, only a crop of the desired portion may be transferred for classification, etc.

Figure 3A:
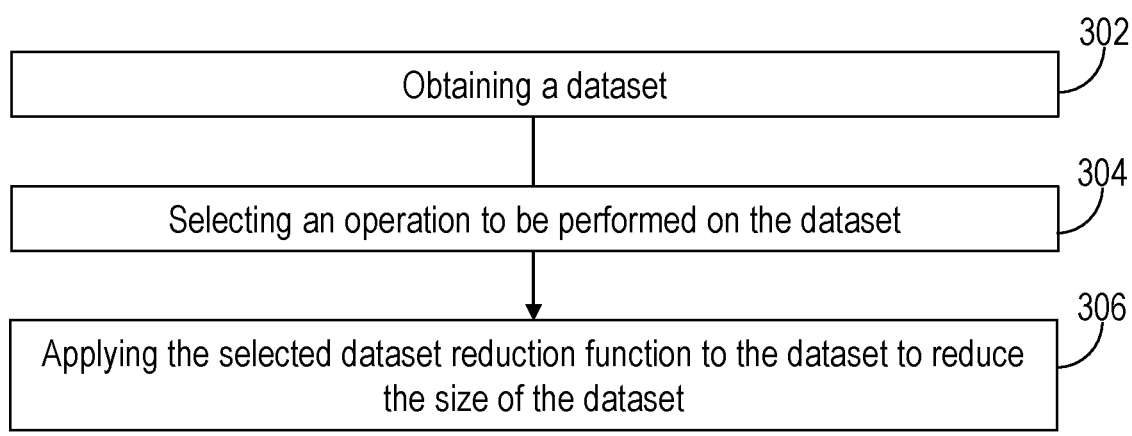
FIG. 3A is a flowchart of a method of data preprocessing for data detection tasks, according to some embodiments of the invention.

Reference is now made to FIG. 3A, which is a flowchart of a method of data preprocessing for data detection tasks, according to some embodiments of the invention.

It is noted that the method is not limited to the flowcharts illustrated in FIG. 3A and to the corresponding description. For example, in various embodiments, the method need not move through each illustrated box or in exactly the same order as illustrated and described.

Some embodiments may include obtaining a dataset (302). For example, one of datasets 113 obtained by sensor 112 of end-unit 110 of system 100 for distributed data detection as described above with respect to FIG. 1.

Some embodiments may include selecting an operation to be performed on the dataset (304). For example, selecting operation 122 by remote computing device 120 as described above with respect to FIG. 1.

Some embodiments may include applying a dataset reduction function to the dataset, the dataset reduction function is predefined for the selected operation (e.g., different dataset size reduction functions may be predefined for different operations) and configured to reduce a size of the dataset as compared to the size thereof prior to the application of the dataset size reduction function (306) (e.g., while yet enabling detecting of a desired data portion in the dataset).

Figure 3B:
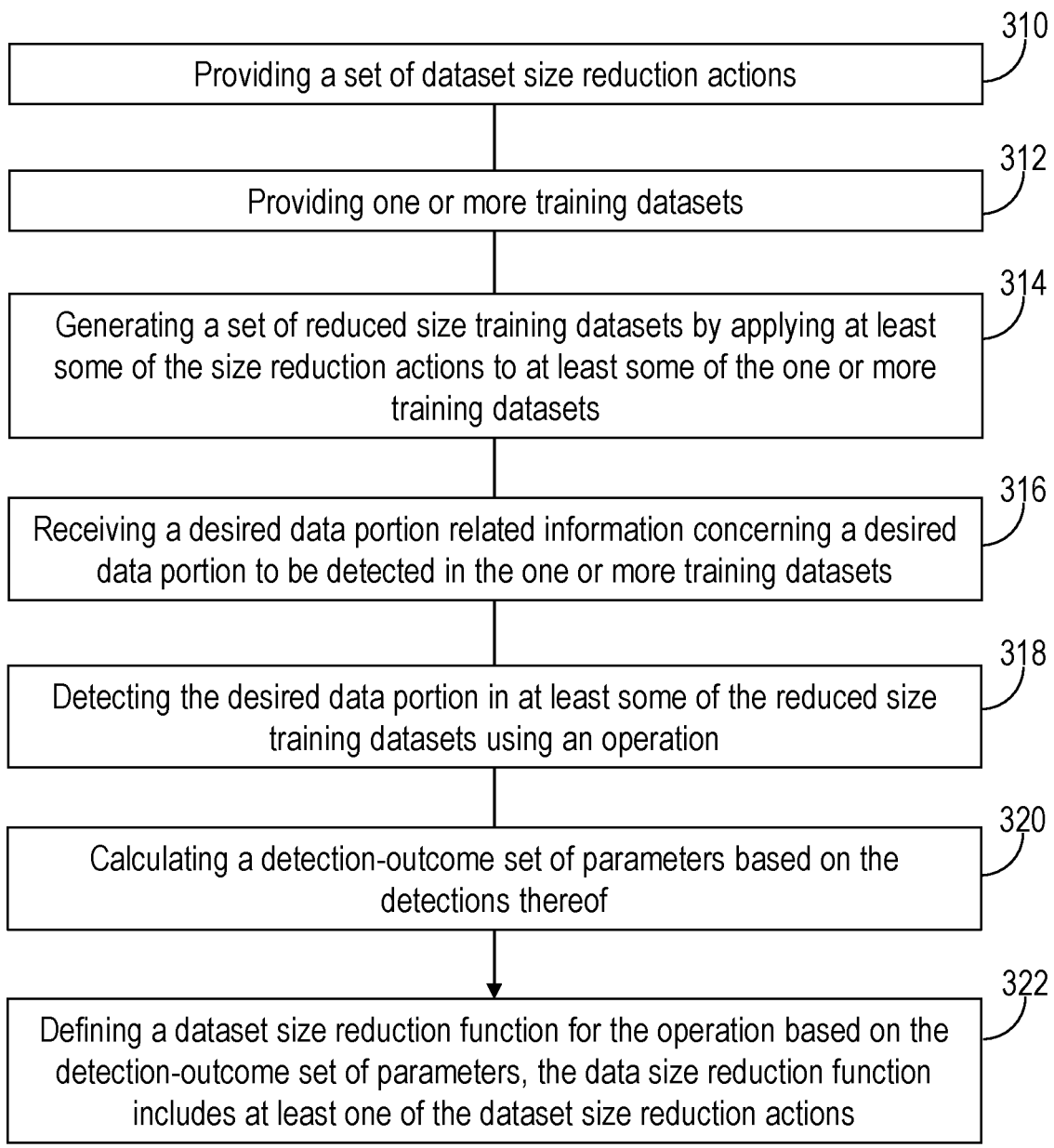
FIG. 3B is a flowchart of a method of predefining a dataset size reduction function for data preprocessing, according to some embodiment of the invention.

Reference is now made to FIG. 3B, which is a flowchart of a method of predefining a dataset size reduction function for data preprocessing, according to some embodiment of the invention.

It is noted that the method is not limited to the flowcharts illustrated in FIG. 3B and to the corresponding description. For example, in various embodiments, the method need not move through each illustrated box or in exactly the same order as illustrated and described.

The method may be used to predefine a dataset reduction function for each of at least some of operations that may be potentially used (e.g., by end-unit 110 as described above with respect to FIG. 1) to detect a desired data portion in obtained datasets.

Some embodiments may include providing a set of dataset size reduction actions (310). The dataset size reduction actions may, for example, include cropping, format modification, filtering, median subtraction, etc.

Some embodiments may include providing one or more training datasets (312). For example, the training dataset(s) may be similar to datasets 113 obtained by sensors 112 of end-unit 110 as described above with respect to FIG. 1.

Some embodiments may include generating a set of reduced size training datasets by applying at least some of the size reduction actions to at least some of the one or more training datasets (314).

Some embodiments may include receiving a desired data portion related information concerning a desired data portion to be detected in the one or more training datasets (316). For example, desired data portion related information 115 as described above with respect to FIG. 1.

Some embodiments may include detecting the desired data portion in at least some of the reduced size training datasets using an operation (318).

Some embodiments may include calculating a detection-outcome set of parameters based on the detections thereof (320). The detection-outcome set of parameters may include at least one of: an accuracy of the detection, a size of the respective training set after application of the respective size reduction action, etc. determined for each of the reduced size training datasets.

Some embodiments may include defining a dataset size reduction function for the operation based on the detection-outcome set of parameters, the data size reduction function includes at least one of the dataset size reduction actions (322). The dataset size reduction function is defined to provide a minimal size of the dataset that yet enables to detect a desired data portion in the reduced size dataset using the operation.

Some embodiments may include repeating 310-322 for each of at least some of operations that may be potentially used to detect a desired data portion in the dataset.

Advantageously, the disclosed method for data preprocessing may enable reducing the size of datasets prior to processing thereof while yet enabling detection of a desired data portion in the reduced size dataset. This may, for example, reduce computational resources required to preprocess and/or process the datasets, reduce a bandwidth required for transmitting the datasets and reduce power consumption required for preprocessing/processing of the datasets, as compared to conventional methods.

Aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of distributed data detection, the method comprising:
   obtaining, by an end-unit comprising a line of sight tracker, a plurality of datasets;
   streaming, by the end-unit to a remote computing device, at least a part of the obtained datasets;
   determining, by the end-unit, end-unit related information and sending the end-unit
   related information to the remote computing device,
   wherein end-unit information comprises available power resources of the end unit;
   receiving, by the remote computing device, a desired data portion related information,
   wherein the desired data portion related information comprises a region of interest based on a line of sight tracked by the line of sight tracker;
   selecting, by the remote computing device, based on at least a part of the obtained datasets and at least one of: the end-unit related information and the desired data portion related information, an operation to be used by the end-unit to detect the desired data portion in at least a part of the obtained datasets;
   detecting, by the end-unit, the desired data portion in at least a part of the obtained datasets using the selected operation,
   applying, by the end-unit or by an external computing device, a predefined dataset size reduction function to at least some of the obtained datasets prior to streaming thereof to the remote computing device, the dataset size reduction is predefined to reduce the size of the datasets as compared to the size thereof prior to the application of the dataset size reduction function, and wherein the dataset reduction function is predefined for the selected operation by:
   providing a set of dataset size reduction actions;
   providing one or more training datasets;
   generating a set of reduced size training datasets by applying at least some of the size reduction actions to at least some of the one or more training datasets;

detecting the desired data portion in at least some of the reduced size training datasets using the selected operation;

calculating a detection-outcome set of parameters based on the detections thereof; and defining the dataset size reduction function for the selected operation based on the detection-outcome set of parameters, the data size reduction function includes at least one of the dataset size reduction actions, wherein the selection of the operation to be used by the end-unit to detect the desired data portion in at least a part of the obtained datasets and/or determination of the operation parameters, optimizes the detection of the desired data portion by the end-unit while taking into account real-time computational capabilities and/or tradeoffs of the end-unit, and wherein the determination of the operation parameters is carried out such that the determination of the operation parameters results, at the end unit, in: a minimal detection latency, a minimal power consumption, and a maximal detection rate.

2. The method of claim 1, further comprising:

determining, by the remote computing device, operation parameters for the selected operation based on at least a part of the obtained datasets and at least one of: the end-unit related information and the desired data portion related information; and detecting, by the end-unit, the desired data portion in at least a part of the obtained datasets using the selected operation and the determined operation parameters.

3. The method of claim 1, further comprising selecting the operation by the remote computing device and detecting the desired data portion by the end-unit in real-time based on the same part of the obtained datasets.

4. The method of claim 1, further comprising selecting the operation by the remote computing device based on a streaming history of the obtained datasets from the end-unit to the remote computing device.

5. The method of claim 1, further comprising selecting the operation by the remote computing device based on at least a part of datasets obtained by one or more additional end-units and based on at least one of: the end-unit related information and the desired data portion related information.

6. The method of claim 1, further comprising:

detecting, by the end-unit, the desired data portion in a first part of the obtained datasets using the selected operation; and detecting, by the remote computing device, the desired data portion in a second part of the obtained datasets using the selected operation.

7. The method of claim 6, further comprising determining a ratio between the first part and the second part of the obtained datasets being processed by the end-unit and the remote computing device, respectively, based on at least one of: a type of the datasets, a type of the desired data portion to be detected, the end-unit related information, a rate of successful detections of the desired data portions by the end-unit and any combination thereof.

8. The method of claim 1, further comprising updating the selected operation based on a rate of successful detections of the desired data portion by the end-unit.

9. The method of claim 1, further comprising determining a rate of transmission of the obtained datasets from the end-unit to the remote computing device based on at least one of: a rate of successful detections of the desired data portion by the end-unit, the end-unit related information, the obtained datasets, a desired latency and any combination thereof.

10. A method of data preprocessing for detection tasks, the method comprising:

obtaining, by an end-unit comprising a line of sight tracker, a dataset;

selecting an operation to be performed on the dataset; and applying a dataset reduction function to the dataset, the dataset reduction function is predefined for the selected operation and configured to reduce a size of the dataset as compared to the size thereof prior to the application of the dataset size reduction function, wherein predefining the reduction function comprises:

providing a set of dataset size reduction actions;

providing one or more training datasets;

generating a set of reduced size training datasets by applying at least some of the size reduction actions to at least some of the one or more training datasets;

receiving a desired data portion related information concerning a desired data portion to be detected in the one or more training datasets, wherein the desired data portion related information comprises a region of interest based on a line of sight tracked by the line of sight tracker;

detecting the desired data portion in at least some of the reduced size training datasets using an operation;

calculating a detection-outcome set of parameters based on the detections thereof; and defining the dataset size reduction function for the operation based on the detection-outcome set of parameters, the data size reduction function includes at least one of the dataset size reduction actions; and wherein the selection of the operation to be used by the end-unit to detect the desired data portion in at least a part of the obtained datasets and/or determination of the operation parameters, optimizes the detection of the desired data portion by the end-unit while taking into account real-time computational capabilities and/or tradeoffs of the end-unit, including available power resources thereof, and wherein the determination of the operation parameters is carried out such that the determination of the operation parameters results, at the end unit, in: a minimal detection latency, a minimal power consumption, and a maximal detection rate.

11. The method of claim 10, further comprising predefining a dataset size reduction for each of at least some of operations that may be potentially used to detect a desired data portion in the dataset.

* * * * *